United States Patent [19]

Welter

[11] Patent Number: 4,538,752
[45] Date of Patent: Sep. 3, 1985

[54] TOP CARRIER FOR A CONVERTIBLE JEEP-TYPE VEHICLE

[76] Inventor: Charles J. Welter, Rte. 2, Box 163, Baldwin, Wis. 54002

[21] Appl. No.: 651,902

[22] Filed: Sep. 19, 1984

[51] Int. Cl.³ ............................................... B60R 9/00
[52] U.S. Cl. .................................... 224/309; 296/37.7
[58] Field of Search .............. 224/309, 311, 314, 319, 224/325; 296/3, 37.7; 280/756, 769

[56] References Cited

U.S. PATENT DOCUMENTS

| | | | |
|---|---|---|---|
| 2,492,841 | 12/1949 | Burkey | 224/42.03 R X |
| 2,779,524 | 1/1957 | Carlson | 224/42.03 R |
| 3,260,929 | 7/1966 | Hedgepeth | 224/321 |
| 3,848,785 | 11/1974 | Bott | 224/319 |
| 3,933,371 | 1/1976 | Graham | 296/102 X |
| 4,168,023 | 9/1979 | Osborn | 224/325 |

Primary Examiner—Stephen Marcus
Assistant Examiner—Robert Petrik
Attorney, Agent, or Firm—Jacobson and Johnson

[57] ABSTRACT

A pair of two piece clamps are removably attached to a roll bar located towards the rear of a convertible jeep-type vehicle and to a rigid cross bar over the roll bar which in turn has connecting bars attaching the rear cross bar to a front cross bar which in turn is attached to the frame of the windshield. The fabric convertible top is secured between the clamp sections. This provides an overhead carrier with a canvas or fabric covering top in place.

8 Claims, 7 Drawing Figures

4,538,752

TOP CARRIER FOR A CONVERTIBLE JEEP-TYPE VEHICLE

FIELD OF THE INVENTION

This invention is for use with convertible jeep-type vehicles which have a roll bar located towards the rear of the vehicle, a windshield contained in a frame which ordinarily has mountings which pivotally attach the windshield to the main frame of the automobile to allow the windshield to be swung open if desired and a canvas or other fabric top running from the top of the windshield frame over the roll bar and down the back of the vehicle to keep it enclosed. This invention provides this type of vehicle with an overhead rigid carrier capable of carrying fairly heavy loads such as a canoe or luggage or skiing equipment or the like while the convertible top provides cover.

DESCRIPTION OF THE PRIOR ART

The only roof top carriers presently being used are those on hard top vehicles. There are a number of carriers of this nature which are fastened or attached in some fashion to the cover of the trunk of an automobile or are clamped in some fashion to the rain troughs or some other suitable portion of the hard top vehicle. There are also carriers which are attached to the hard top by vacuum cups.

SUMMARY OF THE INVENTION

A rear cross bar extending from side to side of the vehicle is located over the roll bar and has the upper section of a two piece clamping member attached near each end. The lower section of each clamp has a U-bolt which goes around the roll bar to hold the clamp firmly in place and a threadable bolt which extends upward through the upper clamp member by which the two sections are drawn together. The fabric convertible top is held between the two clamp members by resilient sealing pads. The only opening through the canvas or fabric top is for the clamping bolt and this opening is sealed closed by the aforesaid resilient pads. A front cross bar paralleling the rear cross bar is located about over the windshield frame and has vertical supports at its ends which are bolted to the same bolt holes on the windhsield frame which are normally used to attach the windshield hinging mechanism to the main frame of the vehicle. The front and rear cross bars are attached to one another by connecting bars. Preferably the connecting bars are pivotally attached to the front cross bar so that the rear cross bar can be raised and lowered without disconnecting the members to enable the canvas top to be removed or inserted as the case may be. Preferably the various pieces are connected together by bolts to allow variations in the dimensions of the various vehicles and for quick and easy disassembly. In addition, to allow for adjustment the bolt holes are preferably slotted. The various rigid members then provide a secure and strong top carrier suitable for carrying fairly heavy loads even with the convertible top in place.

DESCRIPTION OF THE PREFERRED EMBODIMENTS

Figure 1:
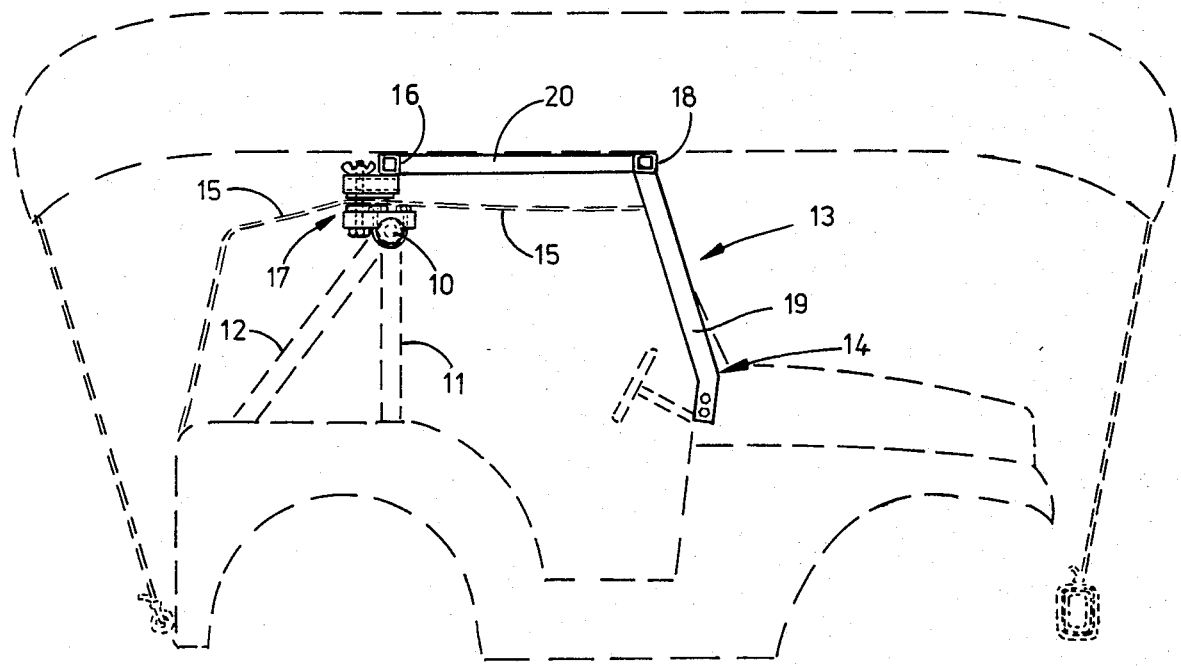
FIG. 1 is a general illustration of how a preferred embodiment of the invention is mounted on a jeep-type convertible vehicle.

A convertible jeep-type vehicle such as outlined in FIG. 1 has an overhead rearwardly mounted roll bar 10 with supports 11 and 12, a front glass windshield 13 enclosed in a suitable frame which is usually hinged at about 14 to the main frame of the vehicle to permit the windshield to be swung open if desired, and an enclosing convertible top 15 made of canvas or other suitable fabric which extends from about the top of the windshield rearwardly and down the back of the vehicle. Additional struts, not shown, are provided to hold up the convertible top.

One of the drawbacks of a vehicle of this nature is the lack of space for carrying luggage or other equipment. Since there is no trunk and the top is soft, luggage or any recreational gear has to be carried in the passenger area. This invention provides an overhead carrier suitable for holding relatively heavy loads even with the convertible top in place. As an example in FIG. 1 there is illustrated a canoe resting on the overhead carrier. In use the front and rear ends of the canoe would probably be tied down to the bumpers of the vehicle as illustrated. The overhead carrier rack of the present invention comprises a rear cross bar 16 over the roll bar 10, a pair of clamps 17, one near each end of the rear cross bar 16 which removably attach the rear cross bar 16 to the roll bar 10, a front cross bar 18, which is generally parallel to rear cross bar 16 and which is attached by vertical support members 19 to the same bolt holes which attach the windshield hinge mechanism to the jeep frame, and connecting bars 20 which connect together the front and rear cross bars 16 and 18.

Figure 3:
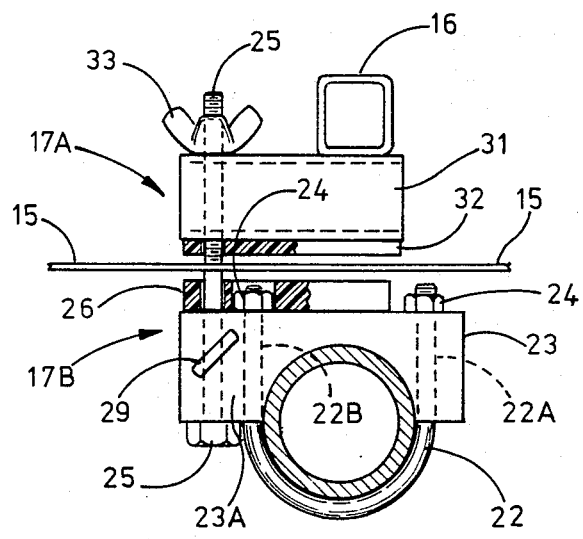
FIG. 3 is a detailed side view of the clamp member which holds the rear cross bar to the roll bar.
Figure 4:
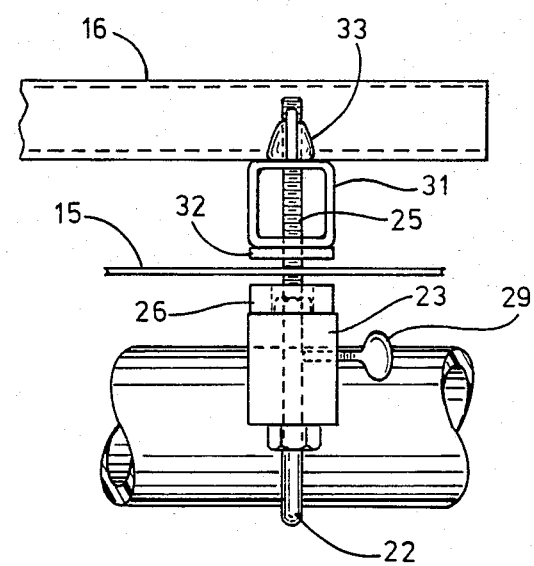
FIG. 4 is a rear view of the clamp member.
Figure 2:
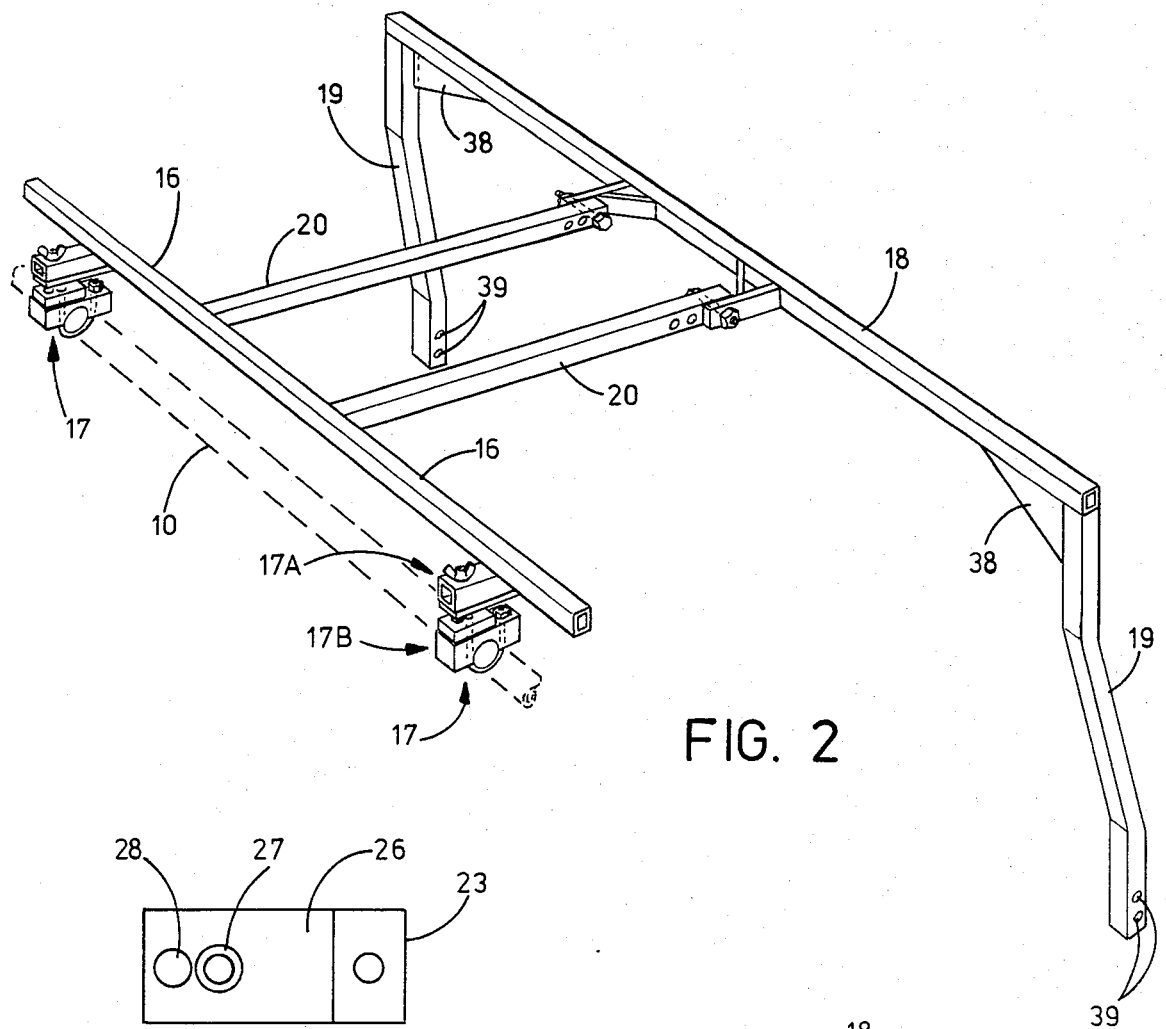
FIG. 2 is a perspective view of the complete assembly of a preferred embodiment of the invention.

Clamp assemblies 17 comprise a top section 17A and a separable lower section 17B. The lower section has a U-bolt 22 suitably dimensioned to snugly fit around the jeep roll bar 10 with upward extending legs 22A and 22B, a steel plate 23 extending between the two legs to close off the top opening of the U-bolt and hollowed out to provide the semicircular opening for the roll bar with an extension 23A to the left of leg 22B as viewed in FIG. 3. The U-bolt 22 is attached to the frame member 23 by nuts 24 threadably engaged with the threaded legs 22A and 22B.

Plate extension 23A has an opening to accommodate clamping bolt 25 which has a head at one end and is threaded at its other end. Attached to the top of plate member 23 in some convenient fashion such as by a suitable adhesive is a pad 26 made of some suitable resilient material. The pad extends from just to the left of leg 22A as viewed in FIG. 3 over leg 22B and frame extension 23A. As best viewed in FIG. 5 clamp pad 26 has a recessed hole 27 to accommodate nut 24 for leg 22B of the U-bolt and an opening 28 for clamp bolt 25. A set screw 29 having a manually operable head passes laterally through plate extension 23A extending into the opening for bolt 25 to hold bolt 25 in place for a purpose which will be described later.

The upper clamp member 17A comprises a plate 31 which is illustrated as an enclosed channel but can be of any suitable rigid, preferably steel, structure with an opening through plate 31 to accommodate bolt 25 and a resilient pad 32 attached by some suitable means such as by a suitable adhesive to the lower face of plate 31 and overlaying pad 26. A wing nut 33 is threadably engaged with the end of bolt 25 to draw the two clamp sections 17A and 17B together.

Figure 5:
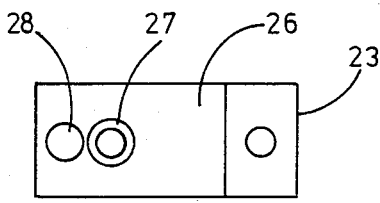
FIG. 5 is a top view of the plate of the lower clamp member.
Figure 7:
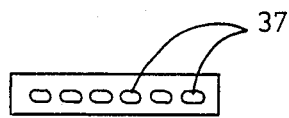
FIG. 7 illustrates slotted holes in the cross bars or connecting bars for adjustment.
Figure 6:
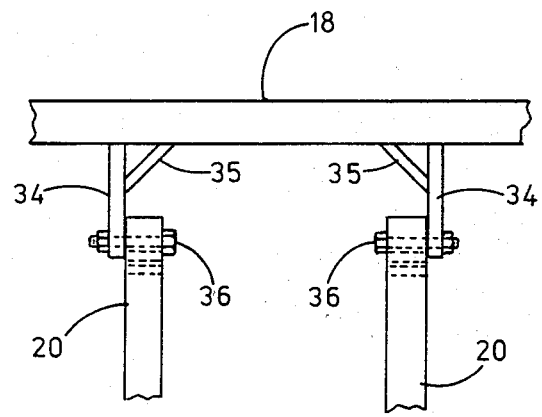
FIG. 6 is a partial view illustrating a manner of attaching the connecting bars to the front cross bar.

Near each end of cross bar 16 each of the upper clamp plates 31 is attached securely, such as by welding. Cross bar 16 is made of some suitable rigid strong structure such as angle iron or steel channel. A pair of connecting bars 20 are attached at one end in some convenient fashion, such as by bolting, to cross bar 16 and extend forward and are attached at their other ends, preferably by a bracket and bolts, to the front cross bar 18. A suggested manner of attachment is illustrated in FIG. 5. A bracket 34 with brace 35 is attached such as by welding to the front cross bar 18 and has holes for accommodating a bolt 36 which passes through suitable openings formed in the connecting bars 20. Preferably the bolt openings are slotted such as illustrated at 35 in FIG. 7. This permits adjustment of the locations of the attachments to take care of the variations of dimensions that can occur between different vehicles. The attachment as illustrated in FIG. 6 provides a pivotal attachment whereby the rear cross bar 16 can be raised and the connecting bars 20 will pivot about the pivot point designated by bolt 36 by merely loosening bolt 36. When rear cross bar 16 has to be raised it can be done without disconnecting any of the component parts of the rack or carrier assembly.

Front cross bar 18 is preferably made of the same construction and material as the rear cross bar 16 and has attached at each end, preferably by bolts, vertical supports 19 also made of some suitable rigid metal bar which may be similar to the cross members. Gussets 38 with suitable bolt holes are provided to permit some adjustment of the vertical supports 19 with respect to the cross bar 18 and to provide a relatively simple and quick disassembly if desired. The vertical supports 19 are shaped to generally follow the line of the side frame of the vehicle windshield and extend down alongside and outside of the windshield frame and have bolt holes 39 at their lower ends which are designed to accommodate mounting bolts which are threaded into the openings on the vehicle which normally attach the windshield hinge mechanism. In other words, to attach the vertical supports 19 the bolts which normally attach the hinge mechanism, not shown, are removed and longer bolts which will accommodate the vertical supports 19 are then inserted through the bolt holes 39 and threaded into the openings in the vehicle frame.

For use, with the fabric top 15 removed and the front roll bar and connecting bars in place as described above, the lower clamp member 17B is attached to the roll bar 10 by placing the U-bolt 22 around the roll bar 10 then placing plate 23 with attached pad 26 over the roll bar and then tightening nuts 24 to secure U-bolt 22 to roll bar 10. The canvas top 15, with suitable openings to accommodate bolts 25 is then placed over the pad 26 and bolts 25 are then inserted and the upper clamp member 17A with attached cross bar 16 and pad 32 is placed over the canvas top. Wing nut 33 is tightened to draw the two clamp sections 17A and 17B securely together with the fabric top 15 held securely in place and the openings therethrough to accommodate bolts 25 are sealed tightly against water leaking in. To do this it is only necessary to initially have the cross bar 16 with the attached upper clamp members 17A raised slightly because of the pivotable attachment to the front cross bar 18 through the connecting bars 20. This is done conveniently and easily without need for disconnecting any of the bolts which hold the various parts together. The structure as described by itself can provide a suitable support for carrying equipment or luggage. Alternatively, a platform can be conveniently attached or other types of racks for holding skis or bicycles or the like can be conveniently attached if desired.

The reason for set screw 29 will now be explained. When the canvas top is being replaced, its supporting struts (not shown) have to pass over cross bar 10 and bolt 25. Therefore, bolt 25 must be lowered just enough to allow the strut to pass over it and then set screw 29 can be hand tightened to keep bolt 25 from dropping. After the canvas top is in place set screw 29 is loosened and bolt 25 is raised through the opening in the canvas and set screw 29 is hand tightened to hold bolt 25 so that the operator can then go outside the vehicle and tighten down wing nut 33.

I claim:

1. An overhead type rack or carrier for a jeep-type vehicle having a front windshield, a fabric top and a roll bar below the fabric top located to the rear of and extending from side to side of the vehicle, comprising:
   (a) a horizontal rigid elongated rear cross bar located above the roll bar;
   (b) clamp means located near each end of said rear cross bar;
   (c) said clamp means comprising:
      I. a rigid upper clamp member securely attached to said cross bar;
      II. a lower U-bolt member for going around said roll bar;
      III. resilient seal means located between said upper clamp member and said U-bolt for releasably holding the fabric cover; and
      IV. means for releasably securing together said U-bolt member and said upper clamp member;
   (d) a rigid elongated front cross bar paralleling and forward of said rear cross bar;
   (e) vertical support rod means attached at each end of said front cross bar;
   (f) means for releasably securing said vertical support rod means to said vehicle;
   (g) rigid hoizontal elongated connecting bar means; and
   (h) means for releasably securing said connecting bar means between said front cross bar and said rear cross bar.

2. The invention as described in claim 1 wherein said seal means comprises a first resilient pad attached to the underside of said upper clamp member and a second resilient pad attached to said U-bolt, said pads being separable to insert or remove the fabric top from between them.

3. The invention as described in claim 1 wherein said vertical support rod means are releasably fastened to the sides of the windshield frame.

4. The invention as described in claim 3 wherein said vertical rods are rigid angle irons having bolt holes for receiving bolts threaded into openings in the windshield frame for releasably fastening the support rods thereto.

5. The invention as described in claim 1 wherein said means for securing said connecting bar means to said front cross bar includes pivotable attachment means.

6. The invention in claim 1 wherein said means for releasably securing said connecting bar means comprises a bracket attached to and extending rearward from the front cross bar having bolt holes therethrough, and a plurality of bolt holes through said connecting bar whereby when bolts are inserted into the bolt holes the connecting bar and front cross bar are adjustably attached together.

7. The invention as described in claim 1 wherein (c)IV comprises:
a rigid plate attached to said U-bolt between the U-bolt legs for passing over the roll bar and having an extension laterally outward from one of the U-bolt legs; a bolt hole through said extension and a corresponding bolt hole through the upper clamp member; a bolt threaded at one end passing upward through said bolt holes; and a fastener for threadably engaging said bolt for clamping together the upper clamp member and the U-bolt plate.

8. The invention as described in claim 2 wherein said U-bolt has rigid plate attached between its legs for passing over the roll bar and a resilient pad located on the upper side of said plate.

* * * * *